(12) United States Patent
Kautzky et al.

(10) Patent No.: US 9,082,421 B2
(45) Date of Patent: Jul. 14, 2015

(54) READER STRUCTURE

(71) Applicant: Seagate Technology LLC, Cupertino, CA (US)

(72) Inventors: Michael Kautzky, Eagan, MN (US); Venkateswara Inturi, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/013,866

(22) Filed: Aug. 29, 2013

(65) Prior Publication Data

US 2015/0062756 A1 Mar. 5, 2015

(51) Int. Cl.
*G11B 5/11* (2006.01)

(52) U.S. Cl.
CPC ........................................ *G11B 5/11* (2013.01)

(58) Field of Classification Search
USPC .......................................................... 360/319
See application file for complete search history.

(56) References Cited

U.S. PATENT DOCUMENTS

| 8,416,538 B2* | 4/2013 | Scholz et al. ................. 360/319 |
| 2009/0002896 A1* | 1/2009 | Mallary et al. ................. 360/319 |
| 2013/0016443 A1* | 1/2013 | de la Fuente et al. ..... 360/123.12 |
| 2013/0141819 A1* | 6/2013 | Mallary et al. ........... 360/125.03 |
| 2014/0177091 A1* | 6/2014 | Urakami et al. ................. 360/75 |

* cited by examiner

*Primary Examiner* — Mark Blouin
(74) *Attorney, Agent, or Firm* — HolzerIPLaw, PC

(57) ABSTRACT

An apparatus disclosed herein comprises a reader structure having a sensor stack and a bottom shield having a first end and a second end on opposite sides of the bottom shield in a cross-track direction, wherein the first end is formed by intersection of arcs.

19 Claims, 6 Drawing Sheets

READER STRUCTURE

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An apparatus disclosed herein includes a reader structure having a sensor stack and a shield having a first end and a second end on opposite sides of the bottom shield in a cross-track direction, wherein the first end is formed by intersection of arcs. These and various other features and advantages will be apparent from a reading of the following detailed description.

BRIEF DESCRIPTIONS OF THE DRAWINGS

DETAILED DESCRIPTIONS

Figure 1:
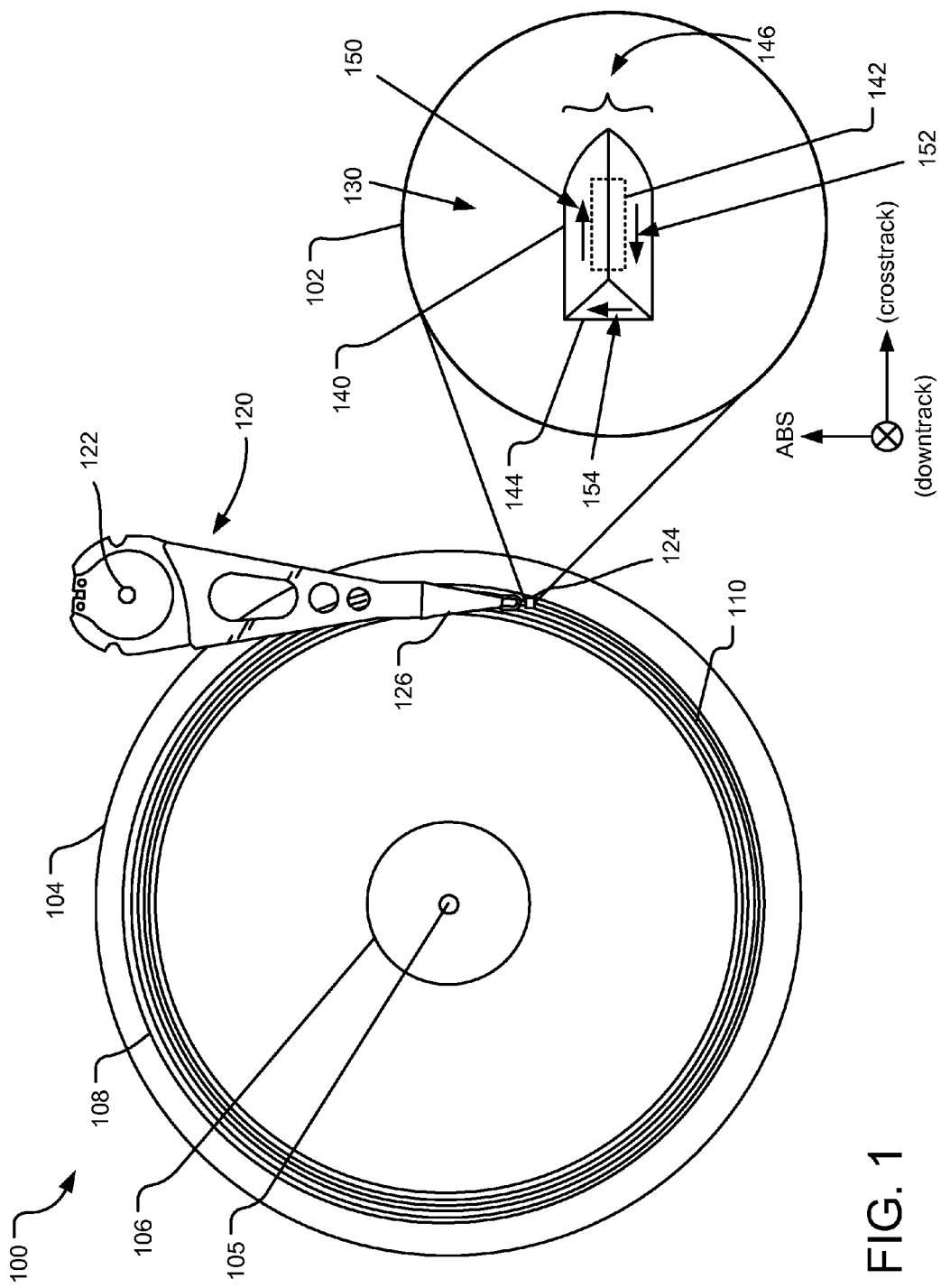
FIG. 1 illustrates a data storage device having an example MR sensor.

A magnetic read head retrieves magnetically encoded information that is stored on a magnetic medium or disc. The magnetic read head is typically formed of several layers that include a top shield, a bottom shield, and a read element or sensor positioned between the top and bottom shield. The read element may be a magnetoresistive device, such as a magnetoresistive (MR) sensor, a giant magnetoresistive (GMR) sensor, or a tunneling magnetoresistive (TMR) sensor. The read element includes at least one layer of a ferromagnetic material, which is magnetized along an easy axis of low coercivity. The read element may be oriented such that the easy axis is transverse to the direction of disc rotation and parallel to the plane of the disc. Magnetic flux from the disc surface causes rotation of the magnetization vector of the ferromagnetic layer of the read element, which in turn, causes a change in electrical resistivity of the read element. The change in resistivity of the read element can be detected by passing a sense current through the read element and measuring a voltage across the read element. External circuitry then converts the voltage information into an appropriate format and manipulates that information as necessary.

During a read operation, the top and bottom shields ensure that the read element reads only the information stored directly beneath it on a specific track of the magnetic medium or disc by absorbing any stray magnetic fields emanating from adjacent tracks and transitions. Specifically, small magnetic elements used as reader shields allow achieving high linear density and protecting against external sources of read sensor instability. To provide predictable responses to media and to avoid effects of external stray fields, a shield should have stable magnetic configuration. Such stable magnetic configuration prevents irregular jumping or reversal of domains that sweep domain walls near the read sensor to reduce noise in the readback process.

An implementation of shields has axisymmetric shape with two-fold symmetry about a vertical centerline axis. For example, an edge of the field perpendicular to an air-bearing surface (ABS) may be of rectangular shape. In an alternative implementation, an edge in the form of a chamfered rectangles. Such shield configurations promote and stabilize single Landau flux closure domains that are generally stable but may demonstrate low saturation during easy and hard axis stray field exposure and higher propensity for forming unfavorable domain states with energy similar to the Landau flux closure domains. This can leave a reader in a noise-prone state and induce errors in readback. The stabilization of the Landau flux closure domains can be improved by shrinking the elements of the reader to very small dimensions, such as for example, 10 μm×10 μm, however, the reduced dimensions can adversely impact the permeability of the shields as well as place the diagonal domain walls close the read sensor, making the domain walls more prone to interaction.

In a trilayer reader designs a permanent magnet (PM) is located behind a sensor (along downtrack direction) and magnetized in a direction perpendicular to the ABS and the PM set is orthogonal to the set direction of domain control structures (DCS). The structure of the trilayer reader creates a need to either use separate DCS and sensor-stabilizing magnets with 90 degree sets or to place the DCS features in one end domain of the rectangular shield. However, placing the DCS features in one end domain of the rectangular shield is only marginally effective because the end domain is small in area compared to the total footprint of the shield.

A read sensor disclosed herein includes a shield with a shield shape that provides a predictable and stable domain configuration as well as increased robustness against stray fields. Furthermore, such a read sensor is also more compatible with a trilayer reader design. Specifically, the read sensor disclosed herein includes a reader structure having a sensor stack and a bottom shield having a first end and a second end on opposite sides of the bottom shield in a cross-track direction, wherein the first end is formed by intersection of arcs. In other words, the bottom shield of the reader structure is bullet shaped, with one end being rectangular and the other end being formed by intersection of arcs.

FIG. 1 illustrates a data storage device 100 having an example MR sensor, shown in more detail in an exploded view 102. Although other implementations are contemplated, in the illustrated implementation, the data storage device 100 includes a storage medium 104 (e.g., a magnetic data storage disc) on which data bits can be recorded using a magnetic write pole and from which data bits can be read using a magnetoresistive element. The storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks 110 on the storage medium 104. A transducer head assembly 124 is mounted on an actuator assembly 120 at an end distal to an actuator axis of rotation 122. The transducer head assembly 124 flies in close proximity above the surface of the storage medium 104 during disc rotation. The actuator assembly 120 rotates during a seek operation about the actuator axis of rotation 122. The seek operation positions the transducer head assembly 124 over a target data track for read and write operations.

The exploded view 102 schematically illustrates a side view of an MR sensor 130. The MR sensor 130 includes a bottom shield 140 and a sensor stack 142 along a down-track direction of the sensor 130. The bottom shield 140 is provided in the shape of a bullet. Specifically, a first end 144 of the bottom shield 140 is rectangular and a second end 146 of the bottom shield 140 is formed by intersection of two arcs. In one implementation, the arcs forming the second end 146 are circular in shape. Alternatively, the second end 146 may be formed by elliptical arcs, or arcs of another geographical shape. Yet alternatively, the second end 146 may be formed as a triangular, however, the smoother transition provided by arc shape provides better performance. The second end 146 may have a pointed end, as illustrated in FIG. 1 or alternatively, the intersection of arcs may such that the second end 146 has a smooth curved end without a distinct end point. Having the second end 146 with a pointed end is more effective in anchoring domain walls and as the curvature of the end point increases, it looses effectiveness in anchoring domain walls. In an example, implementations, the curved side walls of the second end point 146 intersect each other to form a 45 degrees angle for the second end point 146.

The dimensions of the bottom shield 140 may be controlled to have different aspect ratio for the cross-section of the bottom shield 140. For example, in one implementation, the aspect ratio of the bottom shield 140 is 5.2:1, such that the length of the bottom shield 140 along cross-track direction is 5.2 times the width of the first end 144 into the ABS. Alternatively, such aspect ratio may be in the range of 2.0:1 to 6.0:1. The implementation of the bottom shield 140 is shown to have chamfered structure, as illustrated by the triangle 150 along the first end 144. However, in an alternative implementation, a non-chamfered structure may also be provided. Furthermore, while the illustrated implementation shows the sensor stack 142 behind the bottom shield 140, in an alternative implementation, a spacer layer may be provided between the sensor stack 142 and the bottom shield 140.

The shape of the bottom shield 140 in the form of a bullet introduces a centerline corner on the second end 146. The centerline corner effectively traps the horizontal domain wall at the second end 146, thus reducing the number of wall segments participating in the flux closure structure. This results in a single predictable flux closure structure at demagnetized conditions along easy axis (along cross-track direction) and along hard axis (orthogonal to the ABS). The flux along the easy axis is illustrated by the flux-lines 150 and 152, whereas the flux along the hard axis is illustrated by the flux-line 164.

When magnetization reverses along the easy axis, the flux in the bullet shaped bottom shield 140 snaps to this flux closure state more repeatably and without occasional domain walls at low field near the reader. This effect is specifically more pronounced in bottom shields with lower aspect ratio. For example, shields with aspect ratios lower than 3.0:1, may result in higher easy axis saturation field (the field needed to push domain wall to read sensor area), however, such higher easy axis saturation fields are no worse than easy axis saturation fields for other shapes of bottom shields. On the other hand, bottom shields with lower aspect ratios provide higher stability against hard axis fields compared to bottom shields of other shapes. Furthermore, bullet shaped bottom shields with lower aspect ratios are more effective in keeping domain walls away from the sensor stack compared to bullet shaped bottom shields with higher aspect ratios.

Figure 2:
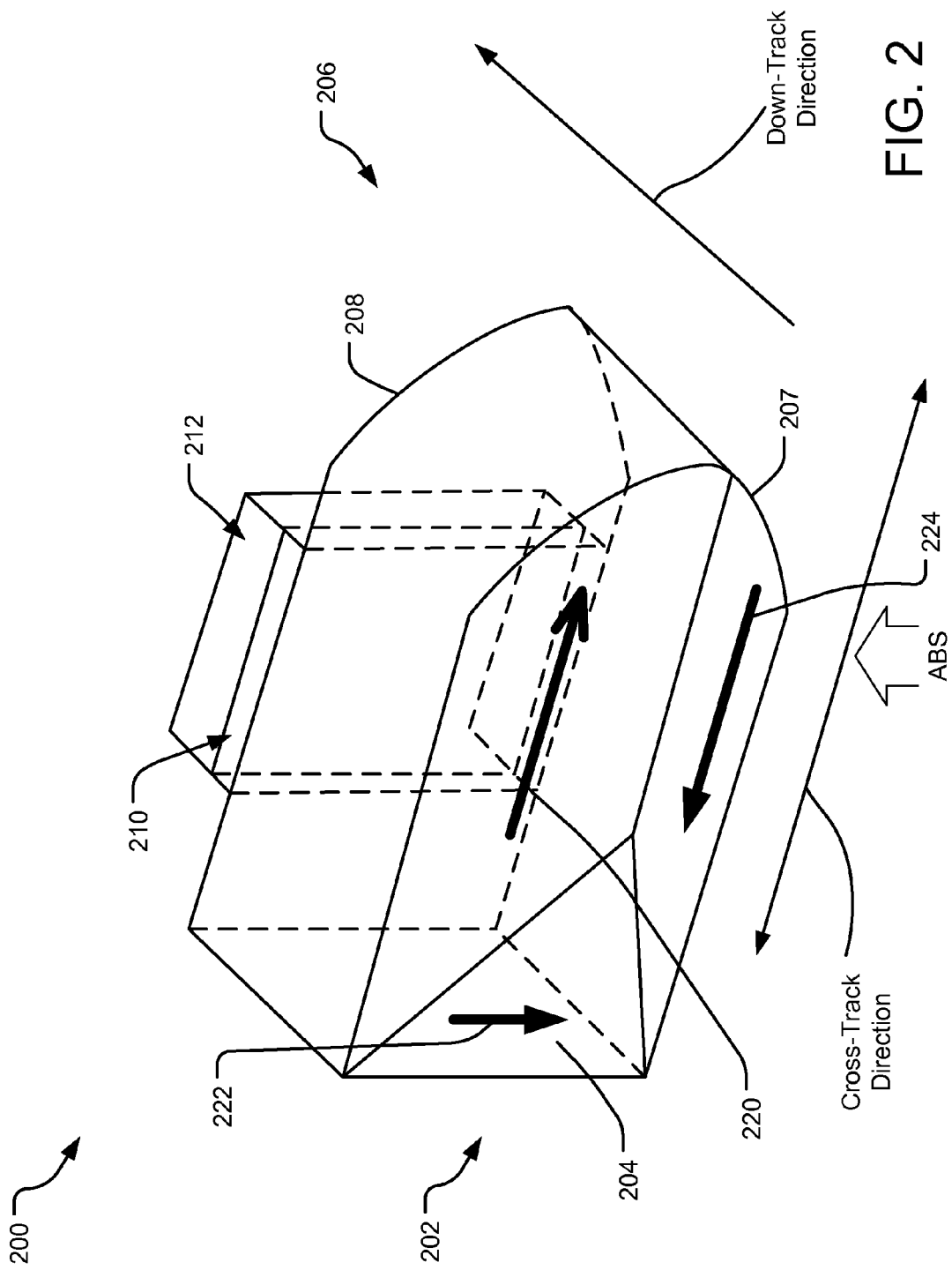
FIG. 2 illustrates a three-dimensional and partial view of an example implementation of an MR sensor.

FIG. 2 illustrates a three-dimensional and partial view of an example implementation of an MR sensor 200. Note that the dimensions of the various components of the MR sensor 200 are not to scale. The MR sensor 200 is illustrated to include a bullet shaped bottom shield 202, a spacer (or gap) layer 210, and a sensor stack 212. The bottom shield 202, the spacer layer 210, and the sensor stack 212 are aligned along the down-track direction of the MR sensor. The bottom shield 202 has a first end 204 that is shaped in the form of a rectangle and a second end 206 that is shaped by intersection of arcs 207 and 208. For example, the second end 206 may be formed by intersection of circular arcs 207 and 208, elliptical arcs 207 and 208, etc. In one implementation, the front surface of the bottom shield 202 (in the down-track direction) may be chamfered.

The bullet shaped bottom shield 202 increases the stability of the MR sensor in the presence of hard axis fields (fields in the direction orthogonal to the ABS). For example, the hysteresis analysis of the MR sensor with bullet shaped bottom shield show that the response of the bullet shield to hard axis fields is more predictable and reproducible compared to bottom shields of other shapes. Specifically, the predictability is higher for bottom shields having lower aspect ratios, for example, below 3.0:1.

The bullet shaped bottom shield 202 also provides the ability to control zero field chirality of the flux closure pattern based on field direction history. Unlike bottom shields having rectangular designs, the flux closure pattern of the bullet shaped bottom shield 202 can be made to orient clockwise or counterclockwise repeatably based on the field history, that is, by application of a hard-axis field in either the up or down directions. This allows the magnetization direction of the closure portion along the ABS to be set in a particular direction without needing DCS structures, such as permanent magnets (PMs) or antiferromagnetic (AFM) elements, that are more process-intensive or sensitive to process conditions.

The capability to control zero field chirality of the flux closure pattern is particularly useful for trilayer design of readers where by selecting the cross-track orientation of the bullet shape in a top shield and in a bottom shield, the orientation of magnetization at the ABS in each of the top shield and the bottom shield can be controlled. Thus, the MR sensor 200 may be provided with a shield (not shown) wherein the cross-track orientation of the bullet shape in the top shield is opposite the cross-track orientation of the bullet shape in the bottom shield 202. For example, when the pointed end of the bullet shape in the bottom shield 202 points to the right (looking in the down-track direction) the pointed end of a bullet shape in a top shield (not shown) may points to the left.

The bullet shape of the bottom shield 202 (and/or a top shield) may introduce thermomechanical asymmetry in the cross-track direction that induces cross-track protrusion differences. In one implementation of the MR sensor 200, the balancing of such cross-track protrusions is achieved by introduction of a non-magnetic metal on the bullet head side (the second side 206 for the bottom shield 202). In an alternative implementation, the sensor stack 212 and/or the spacer layer 210 may be moved off the centerline of the bottom shield 202 and along the cross-track direction For example, the thicker or rectangular end of the bullet protrudes more due to the higher volume of metal there. Thus, the read sensor is shifted towards the thicker end so that the read sensor stays near the point of maximum protrusion or the close point. Yet alternatively, a reader heater (not shown) may also be moved off the centerline of the bottom shield 202 and along the cross-track direction.

Figure 3A:
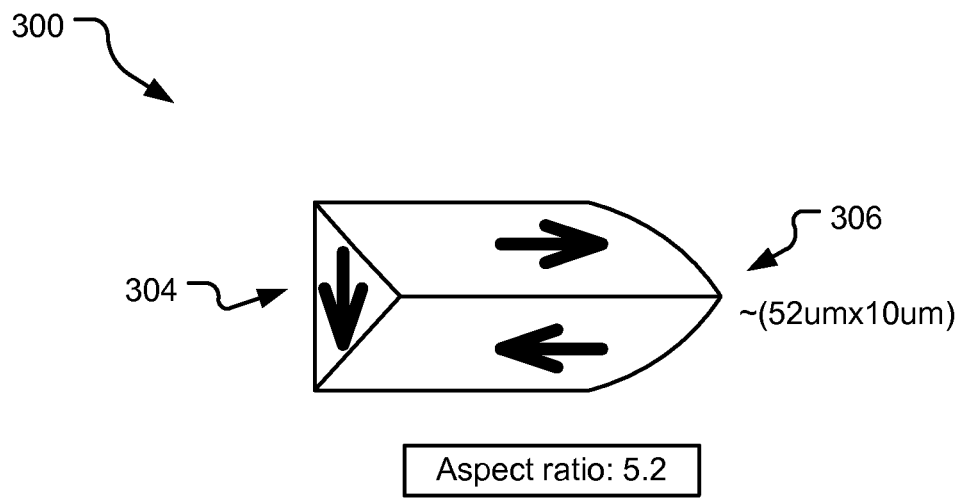
FIGS. 3A and 3B illustrate a side view configuration of an example shield according to the implementations disclosed herein.

FIG. 3A illustrates a side view configuration of an example shield 300 according to the implementations disclosed herein. The shield 300 may be used as a bottom shield or as a top shield in an MR sensor structure. Specifically, the shield 300 includes a substantially rectangular end 304 and a bullet shaped end 306. In the illustrated implementation, the cross-track length of the shield 300 is 52 μm and the width (orthogonal to the ABS) of the shield 300 is 10 μm, giving the shield 300 an aspect ratio of 5.2:1.

Figure 3B:
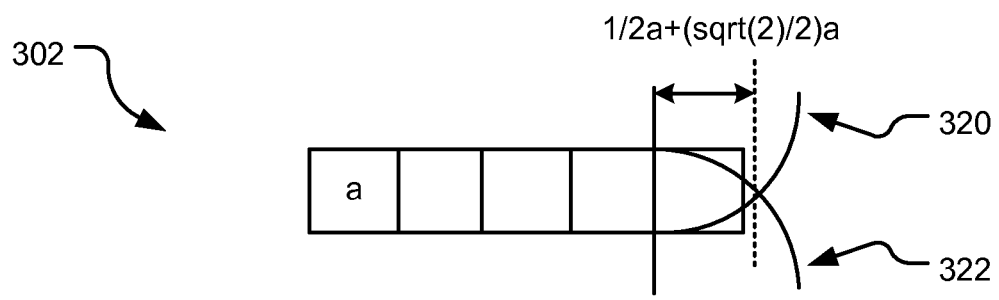

FIG. 3B illustrates the geometrical dimensions 302 of the shield 300. Specifically, FIG. 3B illustrates that the bullet end 306 of the shield 300 is formed as an intersection of two arcs 320 and 322, such that the cross-track length of the shield 300 is substantially equal to a*(4.5+sqrt(2)/2), wherein a is the width of the shield 300 in a direction orthogonal to the ABS. Thus, the aspect ratio of the shield 300 is (4.5+sqrt(2)/2):1, which is approximately equal to 5.2:1.

Figure 4A:
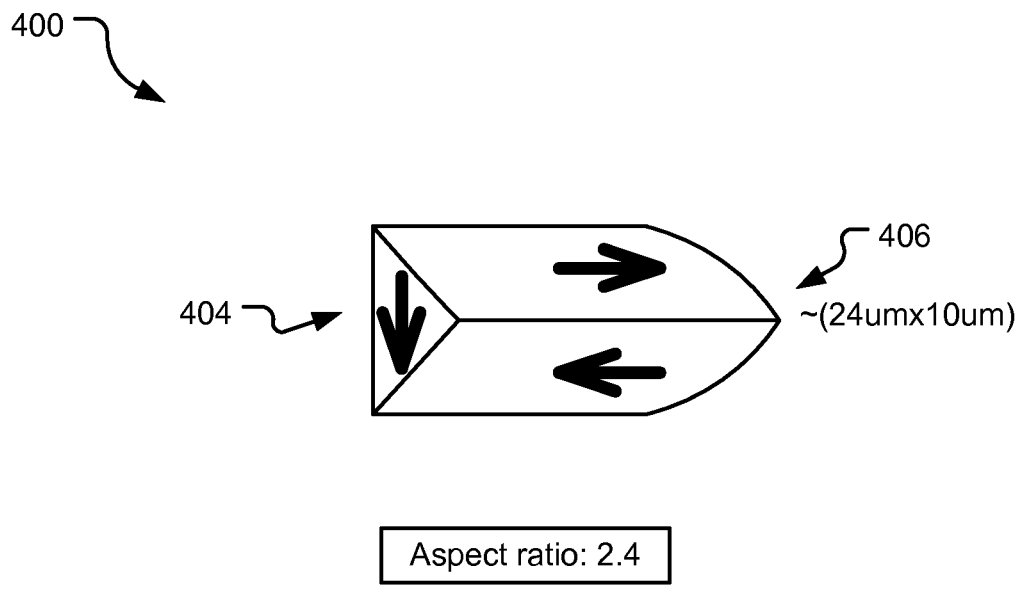
FIGS. 4A and 4B illustrate alternative side view configuration of an example shield according to the implementations disclosed herein.

FIG. 4A illustrates alternative side view configuration of an example shield 400 according to the implementations disclosed herein. The shield 400 may be used as a bottom shield or as a top shield in an MR sensor structure. Specifically, the shield 400 includes a substantially rectangular end 404 and a bullet shaped end 406. In the illustrated implementation, the cross-track length of the shield 300 is 24 μm and the width (orthogonal to the ABS) of the shield 300 is 10 μm, giving the shield 300 an aspect ratio of 2.4:1.

Figure 4B:
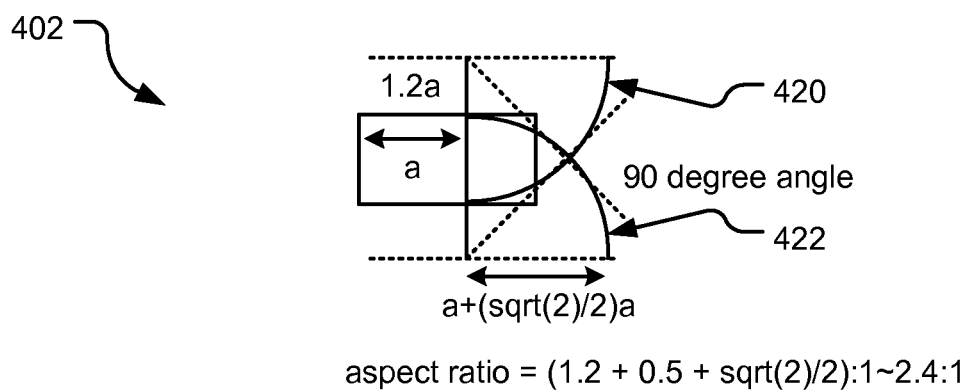

FIG. 4B illustrates the geometrical dimensions 402 of the shield 400. Specifically, FIG. 4B illustrates that the bullet end 406 of the shield 400 is formed as an intersection of two arcs 420 and 422, such that the cross-track length of the shield 300 is substantially equal to a*(1.2+0.5+sqrt(2)/2), wherein a is the width of the shield 400 in a direction orthogonal to the ABS. Thus, the aspect ratio of the shield 400 is (1.2+0.5+sqrt(2)/2):1, which is approximately equal to 2.4:1.

Figure 5:
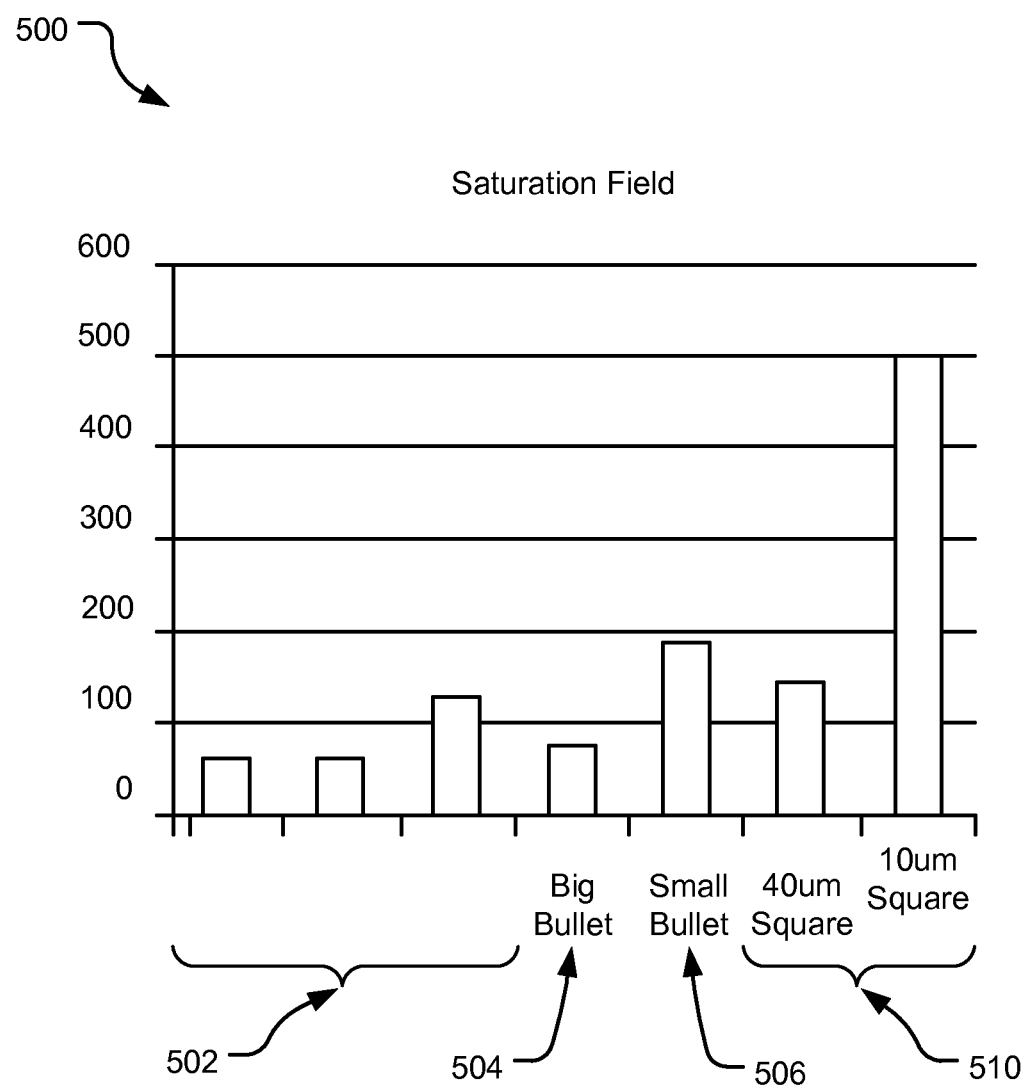
FIG. 5 illustrates a graph of easy axis saturations fields for various implementations of shield.

FIG. 5 illustrates a graph 500 of easy axis saturations field (the field needed to push domain wall to read sensor area) for various implementations of shield structures. Specifically, the graph illustrates the easy axis saturations fields 502 for various implementations of shields having rectangular structure with symmetrical structure along cross-track direction, easy axis saturations field 504 for bullet shaped shield with larger aspect ratio (above 2.4:1), easy axis saturations field 506 for bullet shaped shield with smaller aspect ratio (below 2.4:1), and easy axis saturations fields 510 for square shaped shields having rectangular structure with symmetrical structure along cross-track direction. As shown, the saturation fields for bullet shaped fields are higher compared to rectangular shaped shields but lower than the square shaped shields.

Figure 6A:
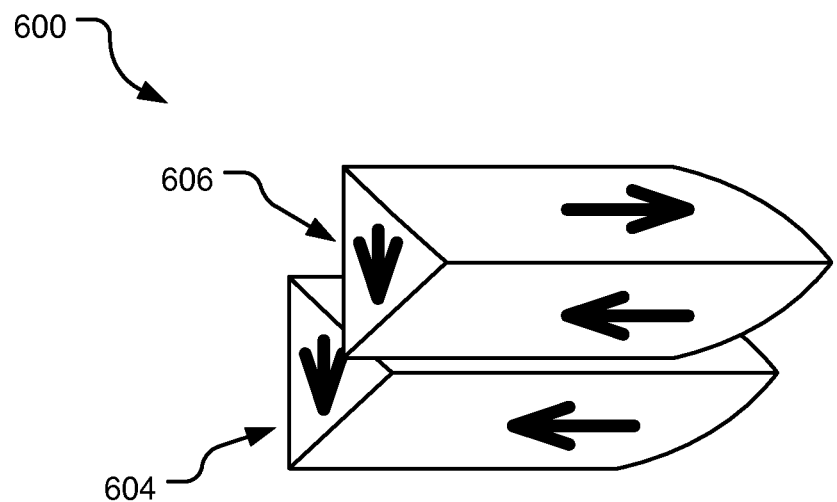
FIGS. 6A and 6B illustrate shield magnetization orientations at ABS for example implementations disclosed herein.
Figure 6B:
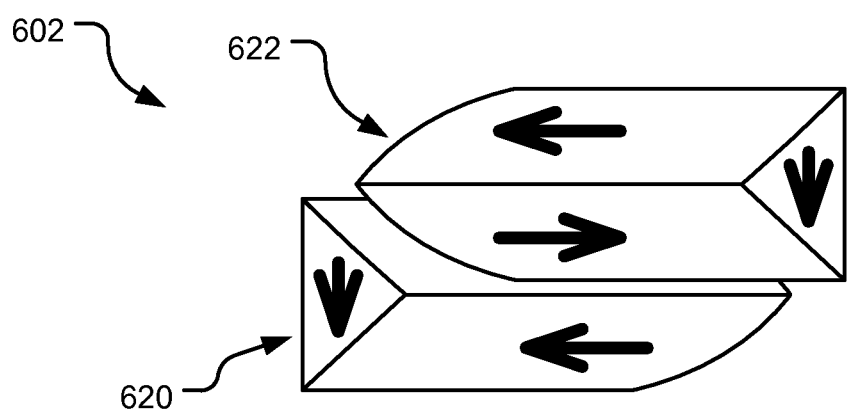

FIGS. 6A and 6B illustrate shield magnetization orientations at ABS for example implementations disclosed herein. Specifically, 600 illustrates shield arrangement for a trilayer sensor structure wherein the cross-track track orientation of a bottom shield 604 and a top shield 606 are aligned. On the other hand, 602 illustrates shield arrangement for a trilayer sensor structure wherein the cross-track track orientation of a bottom shield 620 and a top shield 622 are anti-parallel (in opposite direction) to each other.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus, comprising:
a bottom shield having a first end and a second end on opposite sides of the bottom shield in a cross-track direction, wherein the first end of the bottom shield is asymmetric compared to the second end of the bottom shield;
a sensor stack on a first side of the bottom shield along a down-track direction; and
wherein the sensor stack is located in proximity of the second end compared to the first end along the cross-track direction.

2. The apparatus of claim 1 wherein the first end has a rectangular cross-section in a direction perpendicular to an air-bearing surface (ABS) of the apparatus.

3. The apparatus of claim 1 wherein the second end is formed by intersection of arcs.

4. The apparatus of claim 3 wherein the second end of formed by intersection of circular arcs.

5. The apparatus of claim 3 further comprising wherein the second end of formed by intersection of elliptical arcs.

6. The apparatus of claim 3, wherein the aspect ratio of the bottom shield is substantially in the range of 2:1 to 6:1.

7. The apparatus of claim 1, further comprising a top shield having a third end and a fourth end on opposite sides of the top shield in the cross-track direction, wherein the third end of the top shield is asymmetric compared to the fourth end of the top shield.

8. The apparatus of claim 7, wherein the top shield and the bottom shield are aligned along the cross-track direction.

9. The apparatus of claim 7, wherein the top shield and the bottom shield are anti-parallel along the cross-track direction.

10. The apparatus of claim 1, further comprising a non-magnetic metal member in proximity of the second end compared to the first end along the cross-track direction.

11. A reader comprising:
a shield structure with a first end along a cross-track direction formed by intersection of arcs; and
a sensor track located in proximity of a second end compared to the first end along the cross-track direction.

12. The reader of claim 11 wherein the second end having a rectangular shape.

13. The reader of claim 12 wherein the arcs forming the first end are circular arcs.

14. The reader of claim 12 wherein the arcs forming the first end are elliptical arcs.

15. The reader of claim 12 further comprising a non-magnetic metal member in proximity of the second end compared to the first end along the cross-track direction.

16. A magnetoresistive (MR) sensor comprising:
   a sensor stack;
   a bottom shield having a bullet shape with a first end along a cross-track direction being rectangular and a second end along the cross-track direction being formed by an intersection of arcs; and
   wherein the sensor stack is located in proximity of the second end compared to the first end along the cross-track direction.

17. The MR sensor of claim 16, further comprising a top shield on the opposite side of the sensor stack compared to the bottom shield along a down-track direction, wherein the top shield is bullet shaped.

18. The MR sensor of claim 17, wherein the shape of the top shield and the shape of the bottom shield are aligned along a cross-track direction.

19. The MR sensor of claim 16, wherein the second end of the bottom shield is formed by intersection of at least one of (1) circular arcs and (2) elliptical arcs.

\* \* \* \* \*